(12) United States Patent
Kishikawa et al.

(10) Patent No.: US 10,968,057 B2
(45) Date of Patent: Apr. 6, 2021

(54) COLLECTING CHUTE FOR COMBINATION WEIGHING DEVICE WITH VARIABLE SLOPE TO REDUCE THE VARIATION IN ARRIVAL TIME AT THE DISCHARGE END OF THE CHUTE OF ARTICLES DISCHARGED FROM DIFFERENT HOPPERS ARRANGED AT VARRYING DISTANCES APART

(71) Applicant: Ishida Co., Ltd., Kyoto (JP)

(72) Inventors: Mikio Kishikawa, Ritto (JP); Naomi Imaaki, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 174 days.

(21) Appl. No.: 16/333,975

(22) PCT Filed: Sep. 20, 2017

(86) PCT No.: PCT/JP2017/033953
§ 371 (c)(1),
(2) Date: Mar. 15, 2019

(87) PCT Pub. No.: WO2018/056321
PCT Pub. Date: Mar. 29, 2018

(65) Prior Publication Data
US 2019/0248606 A1    Aug. 15, 2019

(30) Foreign Application Priority Data

Sep. 21, 2016 (JP) .............................. JP2016-183709
Jan. 17, 2017 (JP) .............................. JP2017-005597

(51) Int. Cl.
*G01G 19/393* (2006.01)
*B65G 65/40* (2006.01)
(Continued)

(52) U.S. Cl.
CPC ................. *B65G 65/40* (2013.01); *B65B 1/32* (2013.01); *G01G 19/387* (2013.01); *G01G 19/393* (2013.01)

(58) Field of Classification Search
CPC .... G01G 19/387; G01G 19/393; B65G 65/40; B65G 1/32; B65B 1/32
See application file for complete search history.

(56) References Cited

U.S. PATENT DOCUMENTS 4,444,283 A * 4/1984 Mikami ................. G01G 21/28
177/128
4,602,709 A * 7/1986 Ueda .................... G01G 19/393
177/25.18
(Continued)

FOREIGN PATENT DOCUMENTS

CN       101310167 A       11/2008
CN       102007388 A        4/2011
(Continued)

OTHER PUBLICATIONS

Computer translation of JP 2013-104773 downloaded from the JPO website on Nov. 2, 2020.*
(Continued)

*Primary Examiner* — Randy W Gibson
(74) *Attorney, Agent, or Firm* — Studebaker & Brackett PC (57) ABSTRACT

A collecting chute includes a plurality of chute units having a supply port, a discharge port, and an inner circumferential surface. The chute units are arrayed along a circular virtual line in planar view and are also arrayed securing a space among the chute units at the central portion of the circular virtual line. Each of the chute units has an outer slope that is an inner circumferential surface along the circular virtual line and an inner slope that is the inner circumferential surface located on the back side of an outer circumferential
(Continued)

surface facing the other chute units, and the tilt angle of the inner slope is greater than the tilt angle of the outer slope.

12 Claims, 10 Drawing Sheets

(51) Int. Cl.
    *B65B 1/32*     (2006.01)
    *G01G 19/387*     (2006.01)

(56) References Cited

U.S. PATENT DOCUMENTS

| | | | | |
|---|---|---|---|---|
| 4,614,262 A | * | 9/1986 | Konishi | G01G 19/393 177/25.18 |
| 4,618,012 A | | 10/1986 | Yamano et al. | |
| 5,765,655 A | * | 6/1998 | Tatsuoka | G01G 13/16 177/105 |
| 6,605,785 B1 | * | 8/2003 | Muramiya | G01G 19/393 177/25.18 |

FOREIGN PATENT DOCUMENTS

| | | |
|---|---|---|
| CN | 103026189 A | 4/2013 |
| CN | 105675103 A | 6/2016 |
| EP | 0070647 A2 | 1/1983 |
| JP | S55-146016 A | 11/1980 |
| JP | H06-058328 U | 8/1994 |
| JP | H08-271328 A | 10/1996 |
| JP | 2002-156277 A | 5/2002 |
| JP | 2005-212830 A | 8/2005 |
| JP | 2012-096926 A | 5/2012 |
| JP | 2013-104773 A | 5/2013 |
| JP | 3186528 U | 10/2013 |
| JP | 58-19167 B2 | 11/2015 |
| WO | 2006/033290 A1 | 3/2006 |
| WO | 2007/069544 A1 | 6/2007 |

OTHER PUBLICATIONS

An Office Action mailed by the China National Intellectual Property Administration dated May 7, 2020, which corresponds to Chinese Patent Application No. 201780056851.X and is related to U.S. Appl. No. 16/333,975 with English language translation.

International Search Report issued in PCT/JP2017/033953; dated Nov. 28, 2017.

International Preliminary Report on Patentability and Written Opinion issued in PCT/JP2017/033953; dated Mar. 26, 2019.

* cited by examiner

COLLECTING CHUTE FOR COMBINATION WEIGHING DEVICE WITH VARIABLE SLOPE TO REDUCE THE VARIATION IN ARRIVAL TIME AT THE DISCHARGE END OF THE CHUTE OF ARTICLES DISCHARGED FROM DIFFERENT HOPPERS ARRANGED AT VARRYING DISTANCES APART

TECHNICAL FIELD

One aspect of the present invention relates to a collecting chute that collects articles discharged from a plurality of weighing hoppers and discharges the articles to a packaging device or the like, and a combination weighing apparatus provided with same.

BACKGROUND ART

A collecting chute that collects articles discharged from a plurality of weighing hoppers of a combination weighing apparatus and discharges the articles to a packaging device or the like has been known. The collecting chute has a variety of types. For example, in order to divide articles of a predetermined amount discharged one after another from weighing hoppers into a plurality of discharge ports, there are a collecting chute for which one collecting chute is divided into two parts in the vertical direction (see the following Patent Literature 1), a divided collecting chute that is divided into four parts (see the following Patent Literature 2), and the like.

Such a divided collecting chute is often coupled to a twin-type packaging device installed side by side. For example, two discharge ports of the collecting chute divided into two parts are coupled to the twin-type packaging device directly. Furthermore, four discharge pathways of the collecting chute divided into four parts are put together into two discharge ports and are coupled to the same twin-type packaging device. At that time, because two article receiving ports of the twin type are juxtaposed being spaced apart with a predetermined distance, the two discharge ports of the collecting chute are also provided being spaced apart with a predetermined distance. However, because a supply port that is formed by the upper circumferential edge of the collecting chute is circular corresponding to the circular arrangement of the weighing hoppers, the two discharge ports spaced apart with the predetermined distance are displaced from the central position of the supply port.

CITATION LIST

Patent Literature

Patent Literature 1: Japanese Unexamined Patent Publication No. H8-271328
Patent Literature 2: WO2006/033290

SUMMARY OF INVENTION

Technical Problem

When the two discharge ports are displaced from the central position of the supply port in a plan view, because a sliding distance of the articles from each weighing hopper leading to the discharge port is different, various problems arise. For example, even if the articles are simultaneously discharged from the combination-selected weighing hoppers, because the articles for which the sliding distance is long reach the discharge port late, the articles are likely to be caught in a sealed portion of a bag when sealed in the packaging device. In particular, the articles discharged at both end portions of the collecting chute that has been divided into two parts and is in a semicircle shape reach the discharge port by widely going around adjacent inclined surfaces, and thus, the sliding distance becomes long. Moreover, the pathway of going-around varies depending on the characteristics, shape, size, or the like of the articles. Thus, even if an optimal operation speed is set at the start of operation, because the discharge time of the articles discharged late varies, being caught in the sealed portion may occur often. If the operation speed is lowered in order to avoid such a problem, another problem arises this time in that the productivity is decreased.

One aspect of the present invention has been made in view of those problems, and an object of the one aspect is to provide a collecting chute that is capable of reducing variation in time difference until the articles supplied to the supply port are discharged even when the positions of the two discharge ports are displaced from the central position of the supply port, and a combination weighing apparatus equipped therewith.

Solution to Problem

A collecting chute according to one aspect of the present invention includes a plurality of chute units having a supply port to which articles are supplied, a discharge port from which the articles are discharged, and an inner circumferential surface configured to communicate with the supply port and the discharge port so that an area of the discharge port in planar view seen from a direction in which the articles are supplied is smaller than the area of the discharge port, wherein the chute units are arrayed along a circular virtual line in the planar view and are arrayed securing a space among the chute units at the central portion of the circular virtual line, each of the chute units has an outer slope that is an inner circumferential surface along the circular virtual line and an inner slope that is the inner circumferential surface located on the back side of an outer circumferential surface facing the other chute units, and the tilt angle of the inner slope is greater than the tilt angle of the outer slope. The collecting chute according to one aspect of the present invention may include four chute units.

In this collecting chute, the chute units are arrayed along the circular virtual line in planar view and are also arrayed securing a space among the chute units at the central portion of the circular virtual line, and the tilt angle of the inner slope is formed to be greater than the tilt angle of the outer slope. Thus, the inner slope for which the tilt angle is relatively large in the inner circumferential surface comes close to the discharge port. Accordingly, even if the articles are discharged from the weighing hopper located at the farthest from the discharge port, the articles slide down substantially linearly toward the discharge port without going around the inner slope. As a result, even when the positions of the two discharge ports are displaced from the central position of the supply port, it is possible to reduce the variation in time difference until the articles supplied to the supply port are discharged from the discharge port. Note that the term circular in "circular virtual line" is substantially a circle, that is, a concept including a circle and an ellipse.

The collecting chute according to one aspect of the present invention is a collecting chute for which four chute units having a supply port to which articles are supplied, and a discharge port from which the articles are discharged are arrayed along a circumference, wherein each chute unit has an outer slope along the circumference, and an inner slope facing the other chute units, the inner slope is formed steeper than the outer slope, and at a central portion surrounded by the four chute units, a space running through vertically is defined.

The weighing hoppers that discharge the articles to this collecting chute are arrayed at regular intervals along the outer slope of the four chute units arrayed along the circumference, for example. At the central portion surrounded by the four chute units, the space running through vertically is defined, and thus the steep inner slope facing the other chute units comes close to the discharge port. Thus, even if the articles are discharged from the weighing hopper located at the farthest from the discharge port, the articles slide down substantially linearly toward the discharge port without going around the inner slope. Accordingly, it is possible to reduce the variation in time difference of discharging the respective articles of the head and tail discharged to a packaging device.

In the collecting chute according to one aspect of the present invention, each of the chute units may have, as an outer circumferential surface facing the other chute units, adjacent surfaces facing the chute units on both sides, and an opposing surface facing the other chute unit other than the chute units on both sides via the space, and at the area surrounded by the respective opposing surfaces of the four chute units, the space of a rectangle may be defined.

The central portion of the collecting chute in this case is an area surrounded by the respective opposing surfaces of the four chute units. Because the rectangular space is defined in the area, the inner slope of each chute unit comes close to the discharge port displaced from the center of the circle. Accordingly, the articles discharged at the farthest location of the chute unit from the discharge port, in particular, slide down substantially linearly toward the discharge port without going around the inner slope. As a result, even when the positions of the two discharge ports are displaced from the central position of the supply port, it is possible to reduce the variation in time difference until the articles supplied to the supply port are discharged.

In the collecting chute according to one aspect of the present invention, the four chute units may be divided into two groups with adjacent two chute units as a unit, and by integrating the discharge ports formed to the two chute units belonging to each group, one integrated discharge port may be formed to each group.

The chute units that form a group are adjacent two chute units. Accordingly, in the four chute units arranged from side to side and up and down in planar view, the up and down chute units in each group can be one unit when divided into left and right, or the left and right chute units in each group can be one unit when divided into up and down. The respective discharge ports of the two chute units thus grouped are integrally combined and are integrated to one discharge port. Thus, the articles discharged to the four separate chute units are ultimately put together into two discharge ports and discharged.

In the collecting chute according to one aspect of the present invention, the integrated discharge ports formed to the respective two groups may be arranged so as to face each other across the space. In this case, by interposing the space between the two discharge ports, the two discharge ports can be easily coupled to respective article receiving ports juxtaposed in the twin-type packaging device.

In the collecting chute according to one aspect of the present invention, out of the four chute units, two adjacent chute units may be formed in plane symmetry with respect to a plane orthogonal to a contiguous direction, and two chute units facing each other across the space may be formed in line symmetry with respect to a vertical line running through the central portion of the circular virtual line.

In this collecting chute, by alternately arranging two pairs of chute units having a mirror-image shape, one collecting chute can be made up. Accordingly, it is possible to reduce the manufacturing cost.

In the collecting chute according to one aspect of the present invention, the outer slope may be provided with at least one or more guide plates configured to lead the articles to the discharge port.

The weighing hoppers that discharge the articles to the collecting chute are arrayed at regular intervals along the respective outer slopes of the four chute units of the collecting chute, and thus, on the upper portions of the respective outer slopes, a plurality of places that the articles falling down from above hit on are provided. Out of those places, on the places other than the farthest place from the discharge port and the nearest place thereto, the guide plates that lead to the discharge port the articles falling down from above are provided. Accordingly, even if the articles are discharged from the weighing hopper located at the farthest from the discharge port of the collecting chute, the articles slide down substantially linearly toward the discharge port. When the articles are discharged from the weighing hopper located at the second farthest, although the articles slide down toward the discharge port while detouring slightly, even in that case, it is possible to cause the articles discharged at the second farthest location to slide down substantially linearly toward the discharge port, by the guide plate provided on a part of the outer slope. That is, the articles discharged to a plurality of places on each outer slope slide down substantially linearly toward the respective discharge ports. Accordingly, even if the articles are discharged to any place on the outer slope, the time it takes for the articles to reach the discharge port can be maintained substantially constant. As a result, the operation can be stably continued at a predetermined operation speed. Furthermore, when sealed by the packaging device at a downstream process, the operation speed of the packaging device can be increased up to an extent of speed avoiding the articles being caught in the sealed portion.

In the collecting chute according to one aspect of the present invention, out of an area in which the articles and the outer slope spatially intersect with respect to a substantially horizontal plane, the guide plate may be provided in a part of the area along the outer slope.

In the collecting chute according to one aspect of the present invention, the guide plate may be provided from the uppermost end of the outer slope.

A combination weighing apparatus according to one aspect of the present invention may include a conveying unit configured to convey articles; a plurality of hoppers configured to temporarily store therein the articles conveyed by the conveying unit; a weighing unit configured to weigh a measured value corresponding to a mass of the articles stored in the hopper; a controller configured to select a combination of the measured values from a plurality of the measured values that are weighed by the weighing unit and associated with the hoppers such that a total value results in a target measured value and configured to cause the hoppers that are associated with the relevant combination to discharge the articles; and the above-described collecting chute arranged below the weighing unit in the vertical direction.

The combination weighing apparatus using the above-described collecting chute can maintain substantially constant the time at which the articles discharged from the weighing hoppers reach the packaging device, and thus, the operation speed can be increased when interlocking the combination weighing apparatus and the packaging device.

In the combination weighing apparatus according to one aspect of the present invention, the weighing unit may include a plurality of pool hoppers, and weighing hoppers that are arranged below the respective pool hoppers in the vertical direction, the number of the weighing hoppers being the same as the number of the pool hoppers, the weighing hoppers may be arrayed in a circle along an upper circumferential edge of the collecting chute in planar view seen from a direction in which the articles are supplied, and the collecting chute may collect and discharge the articles discharged from the respective weighing hoppers.

In the weighing hoppers in this case, at the lower stage thereof, it is also possible to further arrange booster hoppers. The booster hopper receives the weighed articles from the weighing hopper not selected for combination and participates in the next combination. When the booster hoppers are used, it is possible to obtain many of weighed articles that can participate in the combination, and thus it is possible to improve the accuracy of combination weighing.

Advantageous Effects of Invention

According to one aspect of the present invention, it is possible to reduce the variation in time difference until the articles supplied to the supply port are discharged even when the positions of the two discharge ports are displaced from the central position of the supply port.

DESCRIPTION OF EMBODIMENTS

An exemplary embodiment of a collecting chute according to one aspect of the present invention and a combination weighing apparatus equipped therewith will be described with reference to the accompanying drawings. As one embodiment, a combination weighing apparatus equipped with 16 pool hoppers and an equal number of weighing hoppers will be described. However, the number of hoppers is not limited thereto. Accordingly, the following embodiment is not intended to limit the technical scope of the one aspect of the present invention.

Figure 1:
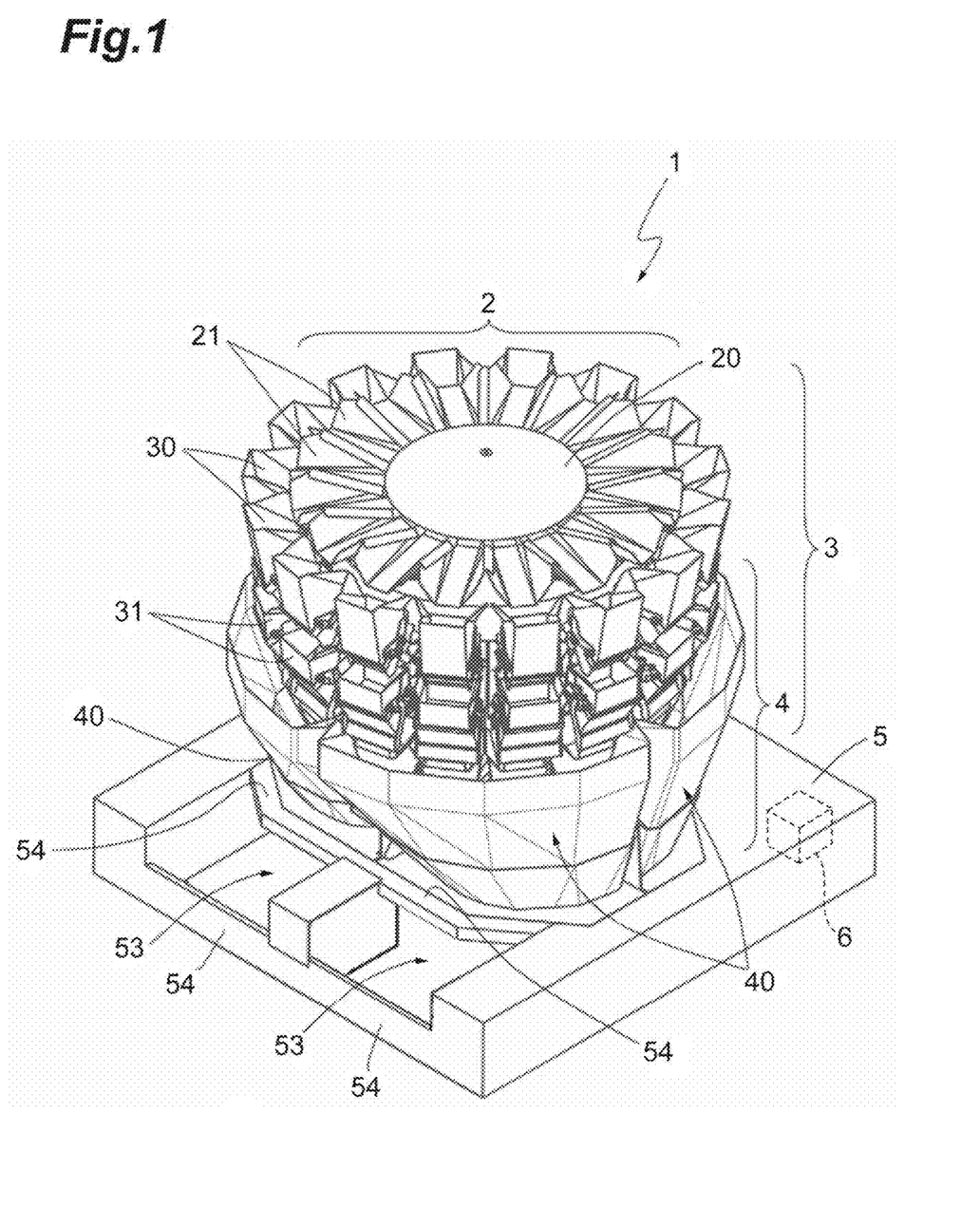
FIG. 1 is an external perspective view of a combination weighing apparatus according to one embodiment.

FIG. 1 illustrates an external perspective view of a combination weighing apparatus as one embodiment. In FIG. 1, a combination weighing apparatus 1 includes a distributing supply unit (conveying unit) 2 in the center of the apparatus, a weighing unit 3 placed at a lower stage thereof, a collecting chute 4 made of stainless-steel and placed at a further lower stage thereof, a support table 5 made of iron supporting the foregoing, and a control device (controller) 6 controlling various units of the combination weighing apparatus 1.

The distributing supply unit 2 radially distributes articles supplied from above the center of the apparatus toward a plurality of pathways. The distributing supply unit 2 is placed in the center of the apparatus, and includes a distributing feeder 20 that stores therein the articles, and a plurality of radial troughs 21 radially arrayed in the periphery thereof. The distributing feeder 20 and each radial trough 21 are attached to respective electromagnetic vibrating devices vibrating individually and are configured to vibrate for a predetermined time and/or at a predetermined amplitude. Thus, the articles supplied onto the distributing feeder 20 are radially distributed toward the periphery and supplied to each radial trough 21. The articles supplied to the radial trough 21 are conveyed toward the distal end portion by the vibration of the radial trough 21, and are discharged from there to the weighing unit 3 of the lower stage. Because such a configuration is well known, detailed descriptions of those are omitted.

The weighing unit 3 includes a plurality of pool hoppers 30 placed below the distal ends of the respective radial troughs 21, an equal number of the weighing hoppers 31 placed in the lower stage thereof, and an equal number of drive units not depicted opening and closing hopper gates thereof individually. The drive units are accommodated in a main body frame surrounded by the pool hoppers 30 and the weighing hoppers 31 in a watertight manner, and the main body frame is supported by supporting legs 50 which will be described later. The articles discharged from the distal end of the radial trough 21 are temporarily stored in the pool hopper 30. When the weighing hopper 31 at the lower stage of the pool hopper 30 discharges the articles, the gate of the corresponding pool hopper 30 is opened and closed, and the articles are supplied to the weighing hopper 31 of the lower stage.

The control device 6, from a plurality of measured values that are measured by the weighing unit 3 and are associated with each of the weighing hoppers 31, selects a combination of measured values such that a total value results in a target measured value, and causes the weighing hoppers 31 corresponding to the combination to discharge the articles. Specifically, the weighing hopper 31, when the articles are supplied, weighs the articles and inputs the measured value to the control device 6. The control device 6 obtains an optimal combination by combining the measured values that have been input, and causes the weighing hoppers 31 concerning the obtained optimal combination to open and close the gates. When the articles are discharged from the selected weighing hoppers 31, the articles thereof are collected by the collecting chute 4 and discharged to the packaging device not depicted. Because such a configuration is well known, detailed description thereof is omitted.

Figure 2:
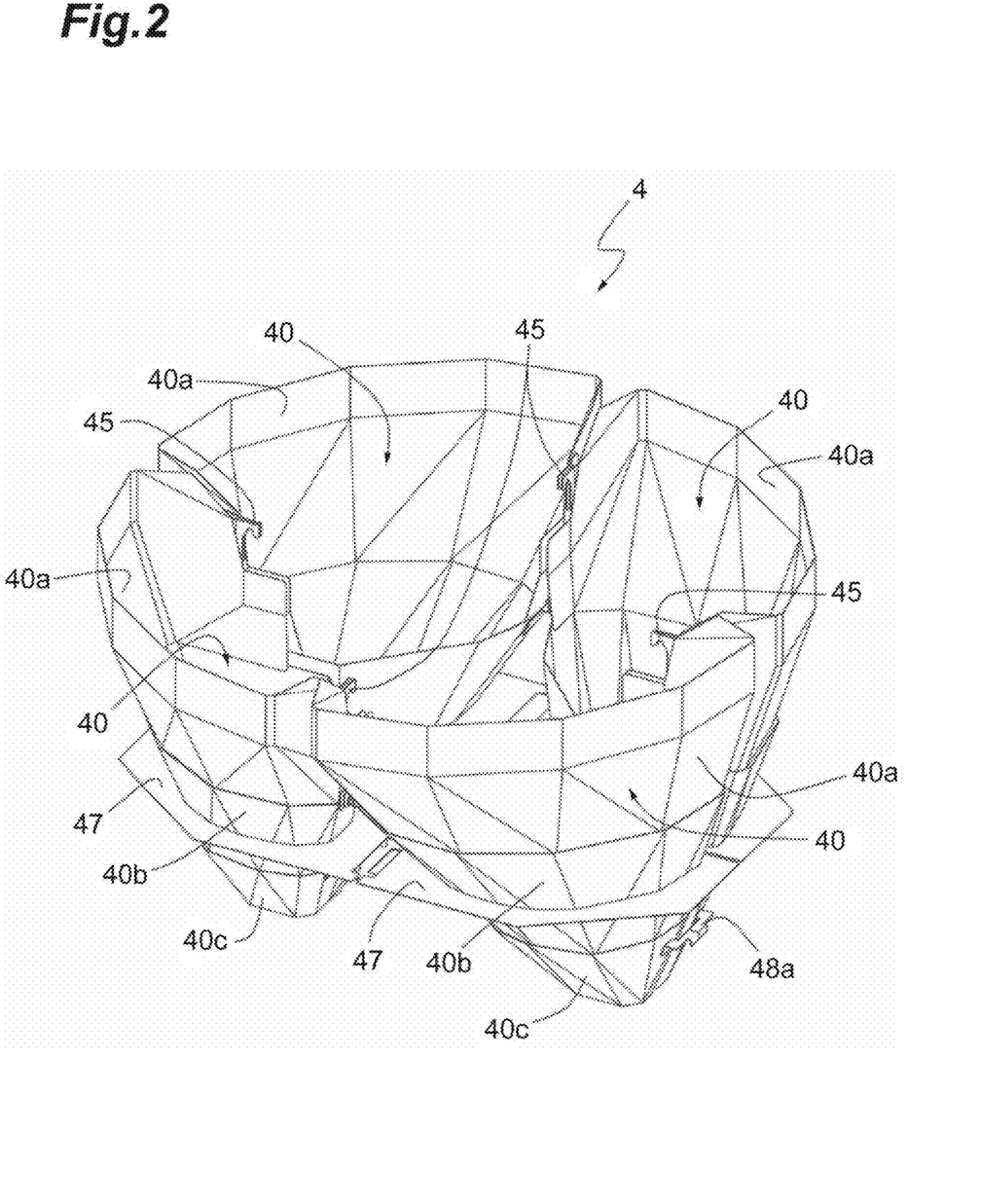
FIG. 2 is an external perspective view of a collecting chute in the embodiment included in the combination weighing apparatus in the embodiment.
Figure 3:
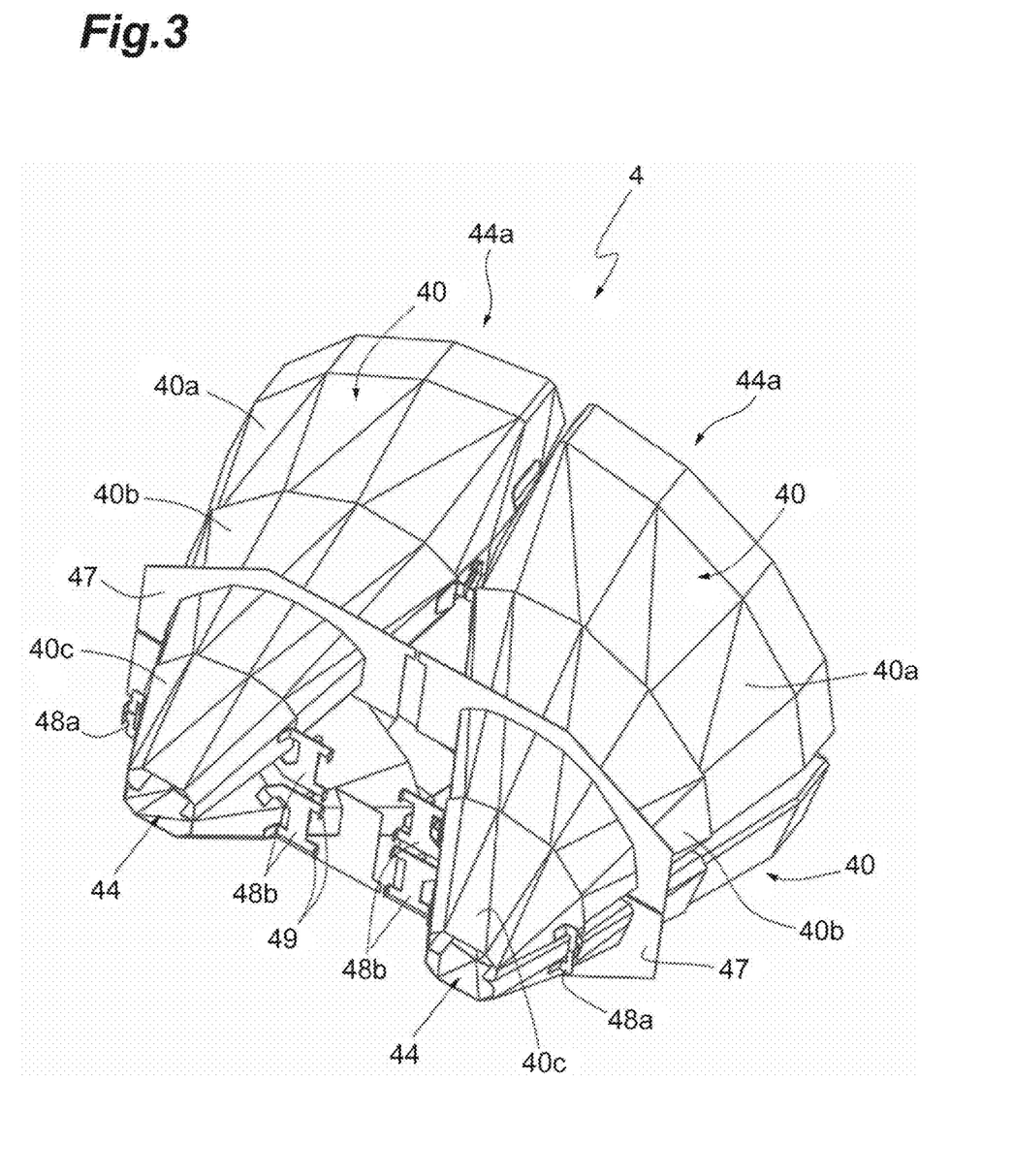
FIG. 3 is an external perspective view of the collecting chute in FIG. 2 in a state of being seen from below.

FIG. 2 illustrates an external perspective view of the collecting chute 4 as the one embodiment, and FIG. 3 illustrates an external perspective view of the collecting chute 4 of FIG. 2 in a state of being seen from below. FIG.

Figure 4:
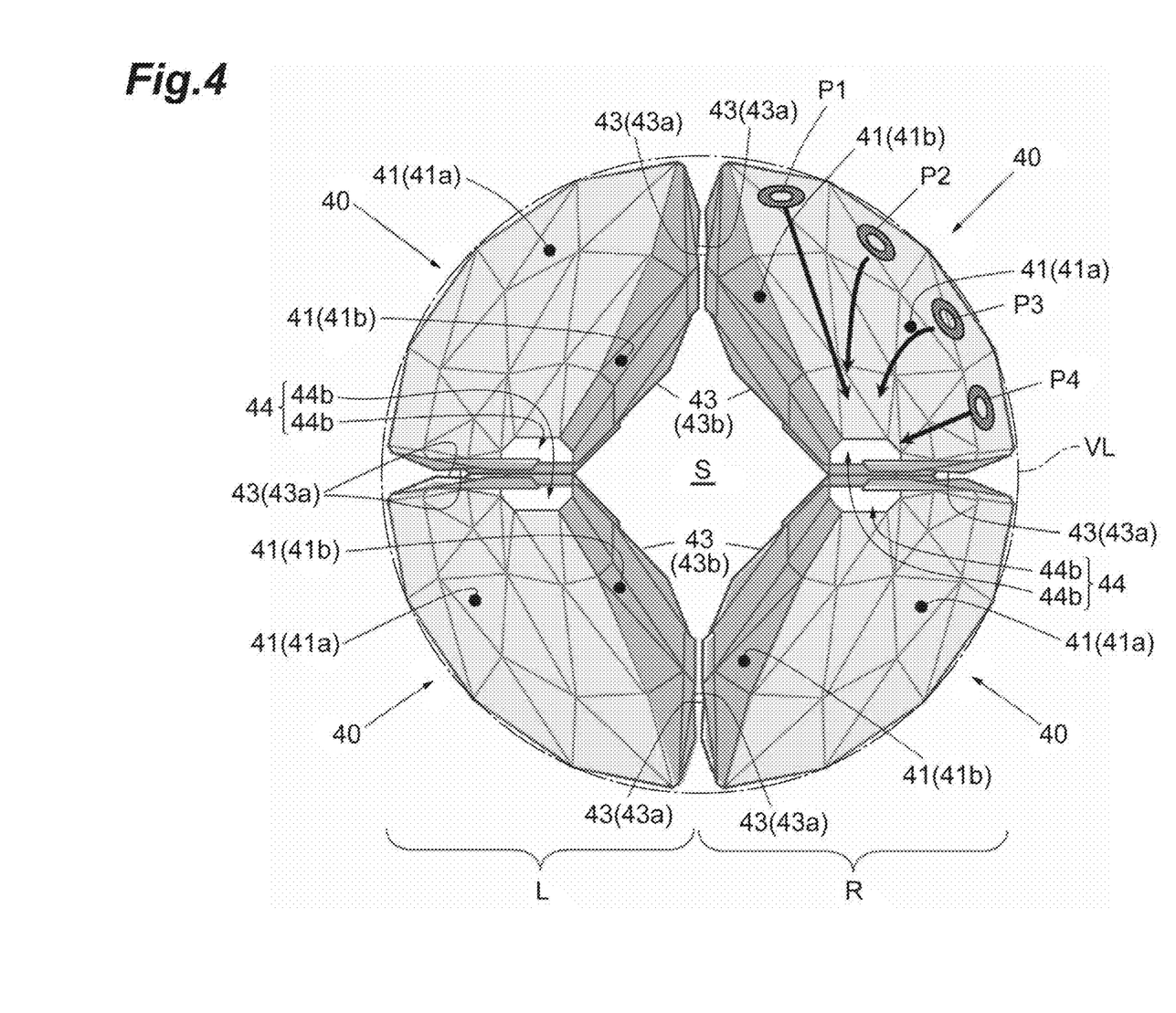
FIG. 4 is a placement configuration diagram of four chute units.
Figure 5:
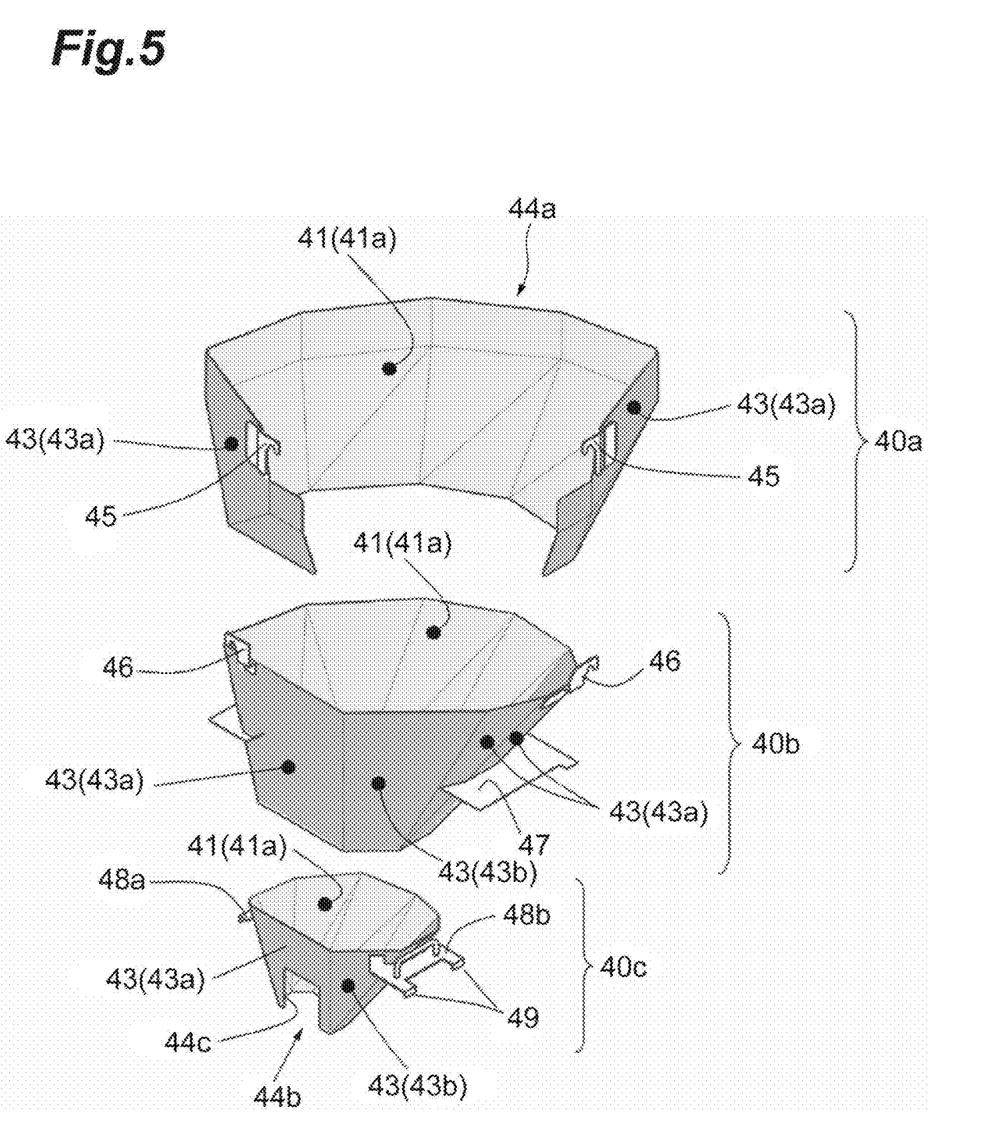
FIG. 5 is an exploded perspective view of one chute unit.
Figure 6:
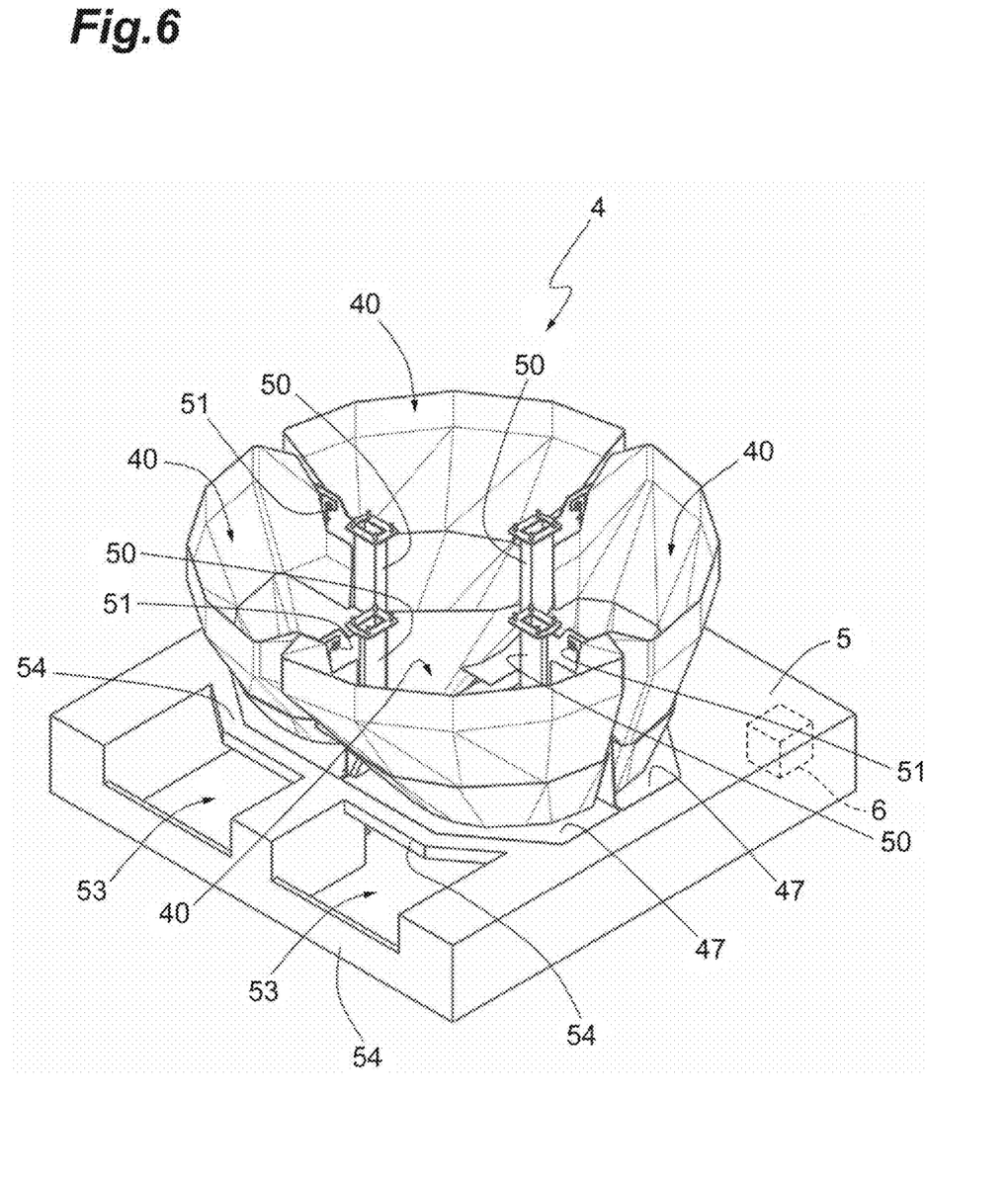
FIG. 6 is an external perspective view of the collecting chute in FIG. 2 in a state of being mounted on a support table.
Figure 7:
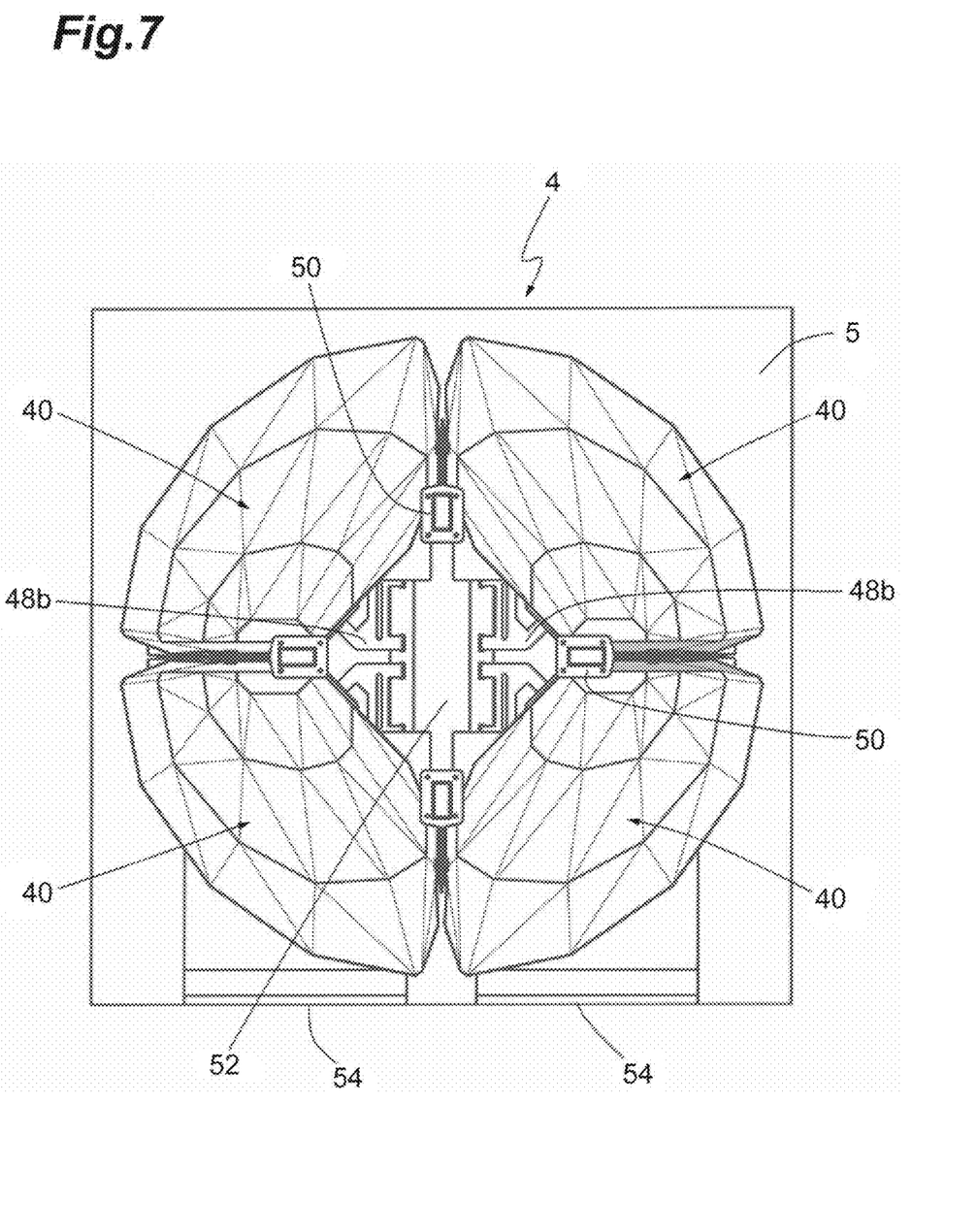
FIG. 7 is a plan view of the collecting chute and the support table in FIG. 6.

4 illustrates an arrayed state of four chute units 40. FIG. 5 illustrates an exploded perspective view of one chute unit 40, FIG. 6 illustrates an external perspective view of the collecting chute 4 in a state of being mounted on the support table 5, and FIG. 7 illustrates a plan view of FIG. 6. As illustrated in FIG. 2 to FIG. 5, the collecting chute 4 is made up of four (a plurality of) chute units 40 by arraying along the weighing hoppers 31 arrayed in a circle. Specifically, the four chute units 40 are arrayed along a circular virtual line VL in planar view seen from the direction in which the articles are supplied, and are also arrayed securing a space S among the chute units 40 at the central portion of the circular virtual line VL. Accordingly, above one chute unit 40, four weighing hoppers 31 are arrayed along the circumference (that is, the circular virtual line VL).

Each chute unit 40 is formed in a funnel shape of a substantially reversed truncated cone shape that converges from an opening in a substantially elliptical shape toward a discharge port 44b in planar view. In other words, each chute unit 40 has a supply port 44a to which the articles are supplied, the discharge port 44b from which the articles are discharged, and an inner circumferential surface 41 that communicates with the supply port 44a and the discharge port 44b so that an area of the discharge port 44b in planar view seen from the direction in which the articles are supplied is smaller than the area of the supply port 44a. The adjacent chute units 40 are formed in a mirror-image shape to each other. Accordingly, these four chute units 40 are formed in line symmetry with respect to the vertical line running through the center of the apparatus, and are formed in plane symmetry with respect to a vertical plane running through the boundary of each chute unit 40.

Each of the four chute units 40 arrayed along the circumference has an outer slope 41a (light shaded portion) along the circumferences of the weighing hoppers 31 arrayed in a circle, and an inner slope 41b (dark shaded portion) that faces the other chute units 40. That is, each of the four chute units 40 has the outer slope 41a that is the inner circumferential surface 41 along the circular virtual line VL, and the inner slope 41b that is the inner circumferential surface 41 located on the back side of an outer circumferential surface 43 facing the other chute units 40. The inner slope 41b is formed steeper than the outer slope 41a. That is, the tilt angle of the inner slope 41b is greater than the tilt angle of the outer slope 41a. The tilt angle is the angle with respect to the horizontal plane. At the central portion surrounded by these four chute units 40, the rectangular space S that runs through vertically is defined.

The outer circumferential surface 43 has adjacent surfaces 43a, 43a that are adjacent to the chute units 40 on both sides, and an opposing surface 43b that faces the chute unit 40, which is sandwiched by the chute units 40 on both sides, at a predetermined distance. The area surrounded by these four opposing surfaces 43b is the space S, and on both sides sandwiching the space S, the respective discharge ports 44b are provided.

Each chute unit 40 is made up of an upper unit 40a, a middle unit 40b, and a lower unit 40c at three stages vertically. The upper unit 40a includes the outer slope 41a and the inner slope 41b, but in the outer circumferential surface 43, the opposing surface 43b is cut off while the adjacent surfaces 43a, 43a on both sides are left. The middle unit 40b also includes the outer slope 41a and the inner slope 41b, but the outer circumferential surface 43 includes the adjacent surfaces 43a on both sides and the opposing surface 43b. The lower unit 40c also includes the outer slope 41a and the inner slope 41b, but the outer circumferential surface 43 includes the adjacent surfaces 43a on both sides and the opposing surface 43b as with the middle unit 40b, and on one of the adjacent surfaces 43a, 43a, a cutout 44c connecting to the discharge port 44b is further provided.

Figure 10:
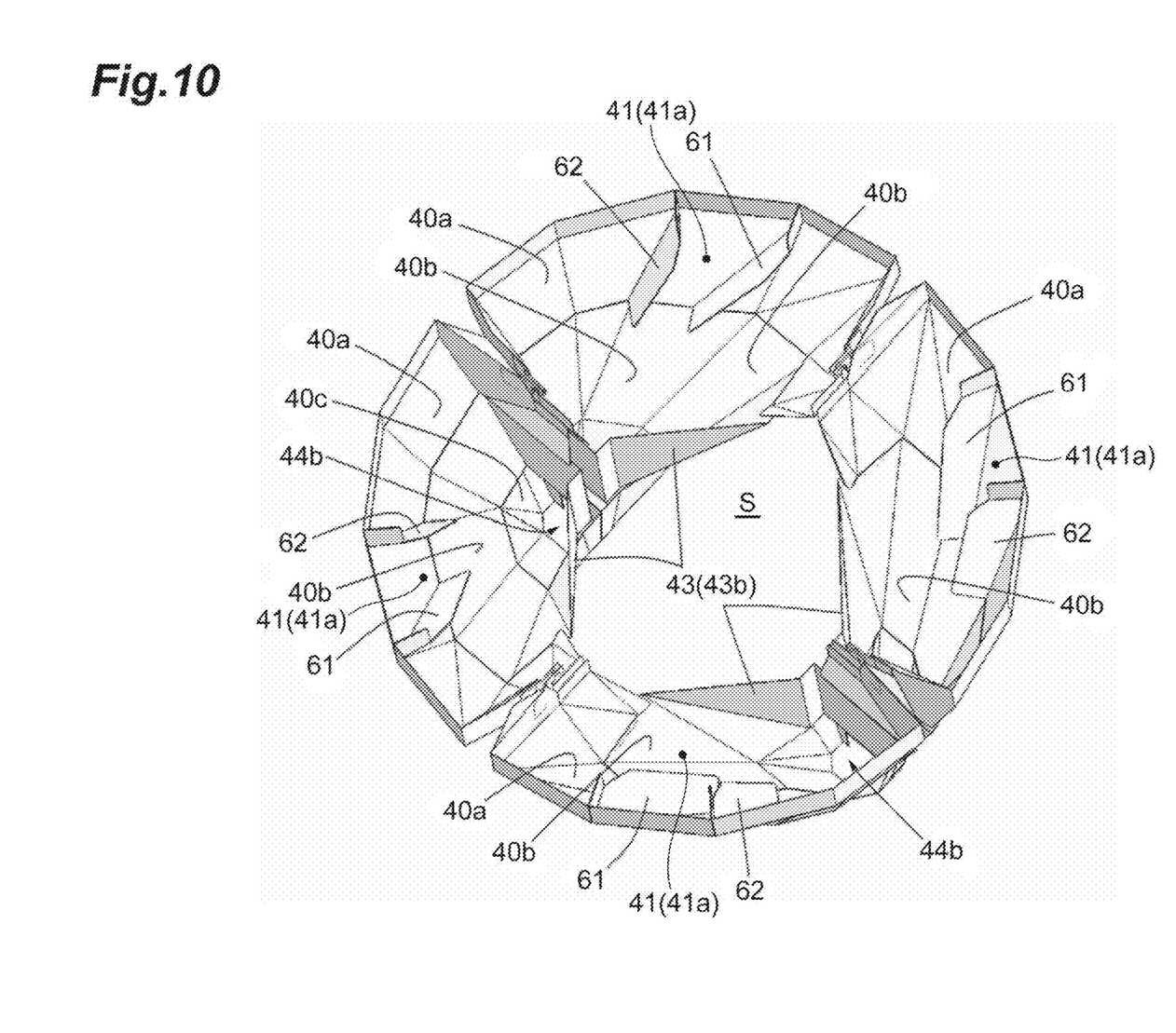
FIG. 10 is an external perspective view of a principal part of the collecting chute in the embodiment in FIG. 8.

In the foregoing embodiment, although the opposing surface 43b of the upper unit 40a has been cut off, the opposing surface 43b of the middle unit 40b may also be cut off as illustrated in FIG. 10. Furthermore, by cutting off the adjacent surface 43a of one side where the cutout 44c of the lower unit 40c is, the adjacent two lower units 40c may be integrated together.

As for each of the three-tier units 40a, 40b, and 40c, the lower end portion of the upper unit is inserted to the inside of the upper end portion of the lower unit. This prevents the articles discharged from the weighing hoppers 31 from leaking out from between the units of each stage when sliding down the units 40a, 40b, and 40c of each stage.

The four chute units 40 are divided into two groups with the adjacent two chute units 40 as a unit. Specifically, the four chute units 40 are, as illustrated in FIG. 4, divided into a group R of the upper and lower chute units 40 on the right-hand side facing toward the drawing, and a group L of the upper and lower chute units 40 on the left-hand side. The respective discharge ports 44b of the two chute units 40 of the left and right groups L and R are integrally combined and are integrated to one integrated discharge port 44. Thus, the adjacent surfaces 43a of the two adjacent lower units 40c illustrated in FIG. 5 adhere tightly to each other and communicate with the integrated discharge port 44 via the cutout 44c of an identical shape provided on their adjacent surfaces 43a. Accordingly, the articles individually collected by the respective chute units 40 are merged at the integrated discharge port 44.

The two integrated discharge ports 44 spaced apart with a predetermined distance face each other across the space S illustrated in FIG. 4. The space S is set to the size corresponding to the interval of each article receiving port of the twin-type packaging device. Accordingly, it becomes easy to couple the two integrated discharge ports 44 spaced apart with the predetermined distance to the twin-type packaging device.

As illustrated in FIG. 6 and FIG. 7, the four chute units 40 are fitted to the support table 5 via the four supporting legs 50. Specifically, hooks 45, 45 are attached to the respective adjacent surfaces 43a, 43a on both sides of the upper unit 40a illustrated in FIG. 5, and the hooks 45, 45 are engaged with and supported by pins 51, 51 provided on the supporting legs 50 and illustrated in FIG. 6. On the supporting leg 50 below the pin 51, a stopper not depicted is provided, and by the stopper, the upper unit 40a is prevented from rotating about the pin 51.

As illustrated in FIG. 5, hooks 46, 46 are also attached to the respective adjacent surfaces 43a, 43a of the middle unit 40b, and on the outer circumference surface corresponding to the outer slope 41a, a bracket 47 horizontally projecting is further provided. The middle unit 40b is supported on the support table 5 by engaging the hooks 46, 46 with the pins not depicted provided on the supporting legs 50, and placing the bracket 47, as illustrated in FIG. 6, on the support table 5.

As illustrated in FIG. 5, the lower unit 40c includes a bracket 48a attached to the outer circumferential surface corresponding to the outer slope 41a and a bracket 48b attached to the outer circumferential surface corresponding to the inner slope 41b. The lower unit 40c is fixed to and supported on a predetermined position of the support table 5 by fitting downward protrusions 49 provided on the distal ends of the brackets 48a and 48b in elongated holes provided on a central frame 52 (see FIG. 7) of the support table 5.

When attaching these three-tier units 40a, 40b, and 40c to the support table 5, the lower unit 40c is placed on the central frame 52 of the support table 5 and attached. Then, the middle unit 40b is placed on the support table 5 and attached. Lastly, the upper unit 40a is attached by hooking the hooks 45 to the pins 51 of the support table 5. When removing these units for cleaning, cleansing, or the like, the units are removed in sequence from the upper unit 40a by the above-described procedure in reverse.

The support table 5, as illustrated in FIG. 1, FIG. 6, and FIG. 7, is formed in a pallet-like shape for which the central portion runs through vertically, and in the through-hole in the center, the collecting chute 4 is placed. Furthermore, below the discharge ports 44b on the lower end of the collecting chute 4, timing hoppers not depicted are attached, and for removing the timing hoppers from above the support table 5, openings 53 are formed in areas extending from the upper surface of the support table 5 to the side surface. The places where the strength is weakened by providing the openings 53 are provided with reinforcing members 54. The reinforcing members 54 are provided on the peripheral edge of the opening 53 on the upper surface side of the support table 5 and on the peripheral edge of the opening 53 on the side surface side. By the reinforcing members 54, the bearing power of the support table 5 and the rigidity are compensated, and the vibration characteristics of the support table 5 are corrected at the same time. This allows previous measurement accuracy to be maintained by a previous vibration rejection filter.

The inside of the support table 5 is hollow, and a power supply unit or the control device 6 such as a circuit board is accommodated therein. On the inner wall of the through-hole of the support table 5, the lower end portions of the four supporting legs 50 are attached, and by the supporting legs 50, the distributing supply unit 2, the weighing unit 3, and the collecting chute 4 are supported.

Above each of such chute units 40, four weighing hoppers 31 each are arranged at equal intervals. In the present embodiment, formed is a polyhedron for which the upper circumferential edge of the outer slope 41a of the upper unit 40a is made into four vertical surfaces corresponding to the number of the weighing hoppers 31 and for which triangular slopes are connected toward the discharge port 44b therefrom. As illustrated in FIG. 4, the articles discharged from the weighing hopper 31 located at the farthest from the discharge port 44b hit on an upper slope P1 of the outer slope 41a, and slide down from there substantially linearly toward the discharge port 44b along the valley of the outer slope 41a as indicated by the arrow. The articles discharged from the weighing hopper 31 located at the nearest from the discharge port 44b hit on an upper slope P4, and slide down from there substantially linearly toward the discharge port 44b as indicated by the arrow.

The chute units 40 of the collecting chute 4 of the above-described embodiment are arrayed along the circular virtual line VL in planar view, and are also arrayed securing the space S among the chute units 40 at the central portion of the circular virtual line. The tilt angle of the inner slope 41b is formed so as to be greater than the tilt angle of the outer slope 41a. Thus, the inner slope 41b for which the tilt angle is relatively large in the inner circumferential surface 41 comes close to the integrated discharge port 44 (the discharge port 44b). Accordingly, even when the articles are discharged from the weighing hopper 31 located at the farthest from the integrated discharge port 44, the articles slide down substantially linearly toward the integrated discharge port 44 without going around the inner slope 41b. As a result, even when the positions of the two integrated discharge ports 44 are displaced from the central position of the supply port 44a in a plan view, it is possible to reduce the variation in time difference until the articles supplied to the supply port 44a are discharged from the integrated discharge port 44. That is, by reducing the slowness and fastness of discharged articles as much as possible, the time before reaching the integrated discharge port 44 after the articles are supplied to the supply port 44a becomes substantially constant, and thus it is possible to stably continue the operation of the packaging device at a predetermined operation speed.

Other Embodiments

As illustrated in FIG. 4, when the articles are discharged to the other upper slopes P2 and P3 except for the upper slope P1 that is the farthest from the discharge port 44b and the upper slope P4 that is the nearest, because the discharged articles head for the discharge port 44b while detouring, the discharged articles may, as indicated by the arrows, collide with the articles sliding down from the farthest upper slope P1 in the course of leading to the discharge port 44b.

Figure 8:
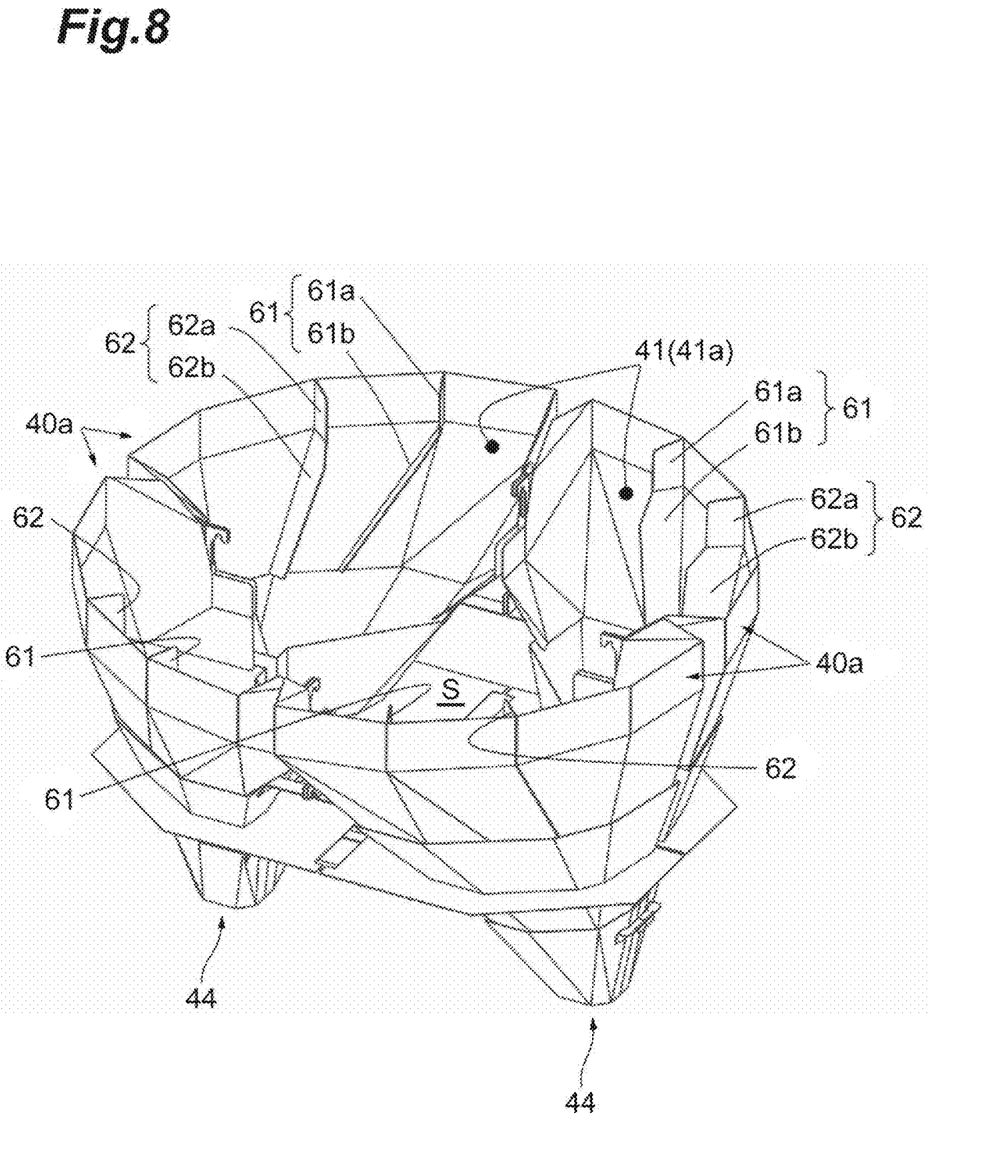
FIG. 8 is an external perspective view of a collecting chute according to another embodiment.
Figure 9:
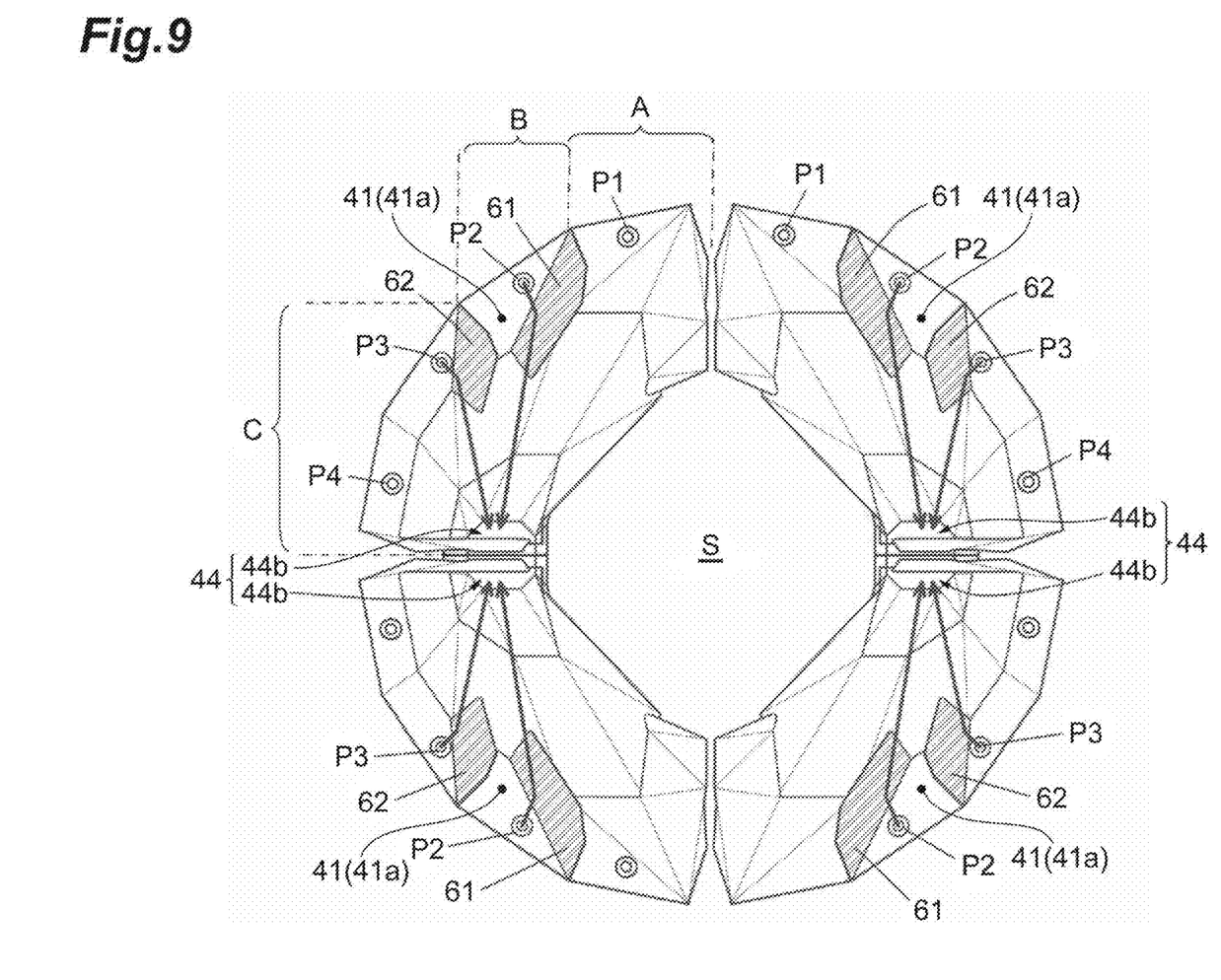
FIG. 9 is a diagram for explaining a placement configuration of the embodiment in FIG. 8.

Thus, in order to avoid such collision, on the outer slope 41a, at least one or more guide plates 61 and 62 that lead the articles to the discharge port 44b may be provided. As illustrated in FIG. 8 to FIG. 10, in the outer slope 41a, the guide plate 61 that substantially linearly guides the articles discharged to the upper slope P2 that is the second farthest from the discharge port 44b toward the discharge port 44b and the guide plate 62 that substantially linearly guides the articles discharged to the upper slope P3 that is the second nearest from the discharge port 44b toward the discharge port 44b may be provided.

The guide plates 61 and 62 of each chute unit 40 are provided on the respective upper units 40a. Each guide plate 61 is made up of a vertical plate 61a (see FIG. 8) that is provided on the folding line in the vertical direction between the upper slope P1 that is the farthest from the discharge port 44b and the upper slope P2 that is the second farthest and an inclined plate 61b (see FIG. 8) that is provided also on the folding line inclining toward the discharge port 44b from the lower end portion of the vertical plate 61a. Each guide plate 62 is made up of a vertical plate 62a (see FIG. 8) that is provided on the folding line in the vertical direction between the upper slope P2 that is the second farthest and the upper slope P3 that is the second nearest and an inclined plate 62b (see FIG. 8) that is provided also on the folding line inclining toward the discharge port 44b from the lower end portion of the vertical plate 62a.

These guide plates 61 and 62 are welded in two-ply. More specifically, the upper unit 40a is separated to a part A in which the upper slope P1 in FIG. 9 and one side of the guide plate 61 connected thereto are included, a part B in which the other side of the guide plate 61, the upper slope P2, and one side of the guide plate 62 are included, and a part C in which the other side of the guide plate 62, and the upper slopes P3 and P4 connected thereto are included, and by overlapping and welding the respective guide plates 61 and 62 of those parts A, B, and C, the upper unit 40a is integrally coupled via the respective guide plates 61 and 62. Accordingly, the guide plates 61 and 62 are coupling portions of the respective adjacent parts A, B, and C. When the articles are discharged to the respective upper slopes P2 and P3 of the upper unit 40a thus formed, the articles hit on those slopes are guided by the respective guide plates 61 and 62 and, as illustrated in FIG. 9, slide down substantially linearly toward the discharge port 44b.

In short, out of the outer slope 41a, the surface on which the articles falling down from above hit (come in contact) is provided with at least one or more guide plates 61 that lead the articles to the discharge port 44b. Furthermore, out of the area in which the articles and the outer slope 41a spatially intersect with respect to a substantially horizontal plane, as illustrated in FIG. 8 to FIG. 10, the respective guide plates 61 are provided in a part of the area. Moreover, the guide plate 61 is provided from the uppermost end of the outer slope 41a.

In the above-described embodiments, four weighing hoppers 31 are arrayed for each chute unit 40, but the embodiment is not limited thereto. Thus, when three or five or more weighing hoppers 31 are arrayed for one chute unit 40, the collecting chute 4 in planar view is a polygon corresponding to the number of weighing hoppers, and a smaller number of the guide plates than that are provided on the outer slope 41a of the collecting chute 4.

As in the foregoing, one aspect of the present invention has been described. However, one aspect of the invention is not limited thereto, and it is also possible to employ other embodiments. For example, it is also possible to employ a configuration in which booster hoppers are arranged in the collecting chute below the weighing hoppers. The booster hopper receives the weighed articles from the weighing hopper not selected for combination and participates in combination together with the weighed values of the other weighing hoppers. Thus, the weighing hoppers in this case use a double-swing opening and closing gate that opens toward the inside and the outside individually, and the booster hopper is arranged below the gate of the weighing hopper that opens toward the inside. Then, when the articles in the booster hopper are selected for the optimal combination, the gate of the booster hopper opens, and the articles are discharged in the collecting chute.

In the above-described respective drawings, although the slopes of the polyhedron of the chute unit 40 are formed by folding a stainless plate at the respective sides (places indicated by thin lines) of a triangle, in lieu of this, the slopes can also be a continuous curved surface by the press and the like.

REFERENCE SIGNS LIST

1 Combination Weighing Apparatus
2 Distributing Supply Unit (Conveying Unit)
3 Weighing Unit
4 Collecting Chute
5 Support Table
6 Control Device (Controller)
31 Weighing Hopper
40 Chute Unit
41 Inner Circumferential Surface
41a Outer Slope
41b Inner Slope
43 Outer Circumferential Surface
43a Adjacent Surface
43b Opposing Surface
44 Integrated Discharge Port
44a Supply Port
44b Discharge Port
50 Supporting Leg
61, 62 Guide Plate
VL Circular Virtual Line

The invention claimed is:

1. A collecting chute comprising:
a plurality of chute units having a supply port to which articles are supplied, each of the chute units including a discharge port from which the articles are discharged, and an inner circumferential surface communicating with the supply port and the discharge port so that an area of the discharge port in planar view seen from a direction in which the articles are supplied is smaller than the area of the supply port, wherein
the chute units are arrayed along a circular virtual line in the planar view and are also arrayed securing a space among the chute units at a central portion of the circular virtual line,
each of the chute units has an outer slope that is the inner circumferential surface along the circular virtual line, and an inner slope that is the inner circumferential surface located on a back side of an outer circumferential surface facing other chute units,
a tilt angle of the inner slope is greater than a tilt angle of the outer slope, and
a first discharge port and a second discharge port form a single, contiguous opening.

2. The collecting chute according to claim 1, wherein a cutout is positioned between a first chute unit of the plurality of chute units directly connected to the first discharge port and a second chute unit of the plurality of chute units directly connected to the second discharge port, the cutout extending in a direction perpendicular to the single contiguous opening such that the first chute and the second chute are open to each other along the cutout.

3. A collecting chute for which four chute units having a supply port to which articles are supplied and a discharge port from which the articles are discharged are arrayed along a circumference, wherein
each chute unit has an outer slope along the circumference, and an inner slope facing the other chute units, and
the inner slope is formed steeper than the outer slope, and at a central portion surrounded by the four chute units, a space running through vertically is defined, wherein
the four chute units are divided into two groups with adjacent two chute units as a unit, and
by integrating the discharge ports formed to the two chute units belonging to each group, one integrated discharge port is formed to each group.

4. The collecting chute according to claim 3, wherein each of the chute units has, as an outer circumferential surface facing the other chute units, adjacent surfaces facing the chute units on both sides, and an opposing surface facing the other chute unit other than the chute units on both sides via the space, and
at an area surrounded by the respective opposing surfaces of the four chute units, the space of a rectangle is defined.

5. The collecting chute according to claim 3, wherein the integrated discharge ports formed to the respective two groups are arranged so as to face each other across the space.

6. The collecting chute according to claim 3, wherein, out of the four chute units, two adjacent chute units are formed in plane symmetry with respect to a plane orthogonal to a contiguous direction, and two chute units facing each other across the space are formed in line symmetry with respect to a vertical line running through a central portion of a circular virtual line.

7. The collecting chute according to claim 3, wherein the outer slope is provided with at least one or more guide plates configured to lead the articles to the discharge port.

8. The collecting chute according to claim 7, wherein, out of an area in which the articles and the outer slope spatially intersect with respect to a substantially horizontal plane, the guide plate is provided in a part of the area along the outer slope.

9. The collecting chute according to claim 7, wherein the guide plate is provided from an uppermost end of the outer slope.

10. A combination weighing apparatus comprising:
a conveying unit configured to convey articles;
a plurality of hoppers configured to temporarily store therein the articles conveyed by the conveying unit;
a weighing unit configured to weigh a measured value corresponding to a mass of the articles stored in the hopper;
a controller configured to select a combination of the measured values from a plurality of the measured values that are weighed by the weighing unit and associated with the respective hoppers such that a total value results in a target measured value and configured to cause the hoppers that are associated with the relevant combination to discharge the articles; and
the collecting chute according to claim 3 arranged below the weighing unit in a vertical direction.

11. The combination weighing apparatus according to claim 10, wherein
the weighing unit includes a plurality of pool hoppers, and weighing hoppers that are arranged below the respective pool hoppers in the vertical direction, the number of the weighing hoppers being the same as the number of the pool hoppers,
the weighing hoppers are arrayed in a circle along an upper circumferential edge of the collecting chute in planar view seen from a direction in which the articles are supplied, and
the collecting chute collects and discharges the articles discharged from the respective weighing hoppers.

12. The collecting chute according to claim 3 wherein at least one cutout is positioned between the two adjacent chute units of one group of the two groups, the at least one cutout extending in a direction perpendicular to a corresponding integrated discharge port such that the two adjacent chute units of the one group are open to each other along the cutout.

* * * * *